United States Patent
Bhide et al.

(10) Patent No.: US 8,484,747 B2
(45) Date of Patent: *Jul. 9, 2013

(54) METHOD AND SYSTEM FOR MANAGING ELECTRONIC MESSAGES

(75) Inventors: Manish Anand Bhide, New Delhi (IN); Ajay Kumar Gupta, New Delhi (IN); Mukesh Kumar Mohania, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 12/117,836

(22) Filed: May 9, 2008

(65) Prior Publication Data

US 2009/0282494 A1 Nov. 12, 2009

(51) Int. Cl.
H04L 29/06 (2006.01)

(52) U.S. Cl.
USPC .............. 726/28; 726/21; 726/30; 715/271; 715/272; 715/277

(58) Field of Classification Search
None
See application file for complete search history.

(56) References Cited

U.S. PATENT DOCUMENTS

| | | | |
|---|---|---|---|
| 6,178,243 B1 * | 1/2001 | Pomerantz et al. | 380/243 |
| 6,446,050 B1 * | 9/2002 | Kondo et al. | 705/51 |
| 6,823,368 B1 * | 11/2004 | Ullmann et al. | 709/206 |
| 6,918,039 B1 * | 7/2005 | Hind et al. | 726/3 |
| 7,536,635 B2 * | 5/2009 | Racovolis et al. | 715/229 |
| 7,890,593 B2 * | 2/2011 | Chen et al. | 709/206 |
| 7,913,167 B2 * | 3/2011 | Cottrille | 715/271 |
| 8,041,745 B2 * | 10/2011 | Newton et al. | 707/802 |
| 8,099,465 B2 * | 1/2012 | Daniels et al. | 709/206 |
| 8,181,261 B2 * | 5/2012 | Sperry | 726/28 |
| 2002/0065777 A1 * | 5/2002 | Kondo et al. | 705/54 |
| 2003/0097414 A1 * | 5/2003 | Cabello | 709/206 |
| 2003/0115271 A1 * | 6/2003 | Weissman | 709/206 |
| 2004/0249892 A1 * | 12/2004 | Barriga et al. | 709/206 |
| 2005/0005116 A1 * | 1/2005 | Kasi et al. | 713/170 |
| 2005/0033813 A1 * | 2/2005 | Bhogal et al. | 709/206 |
| 2005/0091338 A1 * | 4/2005 | de la Huerga | 709/217 |
| 2005/0097339 A1 * | 5/2005 | Wiley et al. | 713/188 |
| 2005/0108351 A1 * | 5/2005 | Naick et al. | 709/207 |
| 2005/0204008 A1 * | 9/2005 | Shinbrood | 709/206 |
| 2005/0283824 A1 * | 12/2005 | Nakamura et al. | 726/1 |
| 2006/0026502 A1 * | 2/2006 | Dutta | 715/511 |
| 2006/0041625 A1 * | 2/2006 | Chen et al. | 709/206 |

(Continued)

FOREIGN PATENT DOCUMENTS

DE 10318373 A1 * 12/2004
JP 11068831 A * 3/1999

OTHER PUBLICATIONS

Office Action Communication dated Jan. 21, 2011, U.S. Appl. No. 12/117,829.

(Continued)

*Primary Examiner* — Nathan Flynn
*Assistant Examiner* — Michael R Vaughan
(74) *Attorney, Agent, or Firm* — Gibb & Riley, LLC

(57) ABSTRACT

A computer implemented method, computer program product and a data processing system for managing electronic messages is disclosed. The contents of an electronic messages are segmented based on the recipients receiving the message and access control authorizing access to the segmented contents is provided to the segmented contents and transmitted to a list of recipients.

17 Claims, 5 Drawing Sheets

U.S. PATENT DOCUMENTS

| | | | | |
|---|---|---|---|---|
| 2006/0041626 A1* | 2/2006 | Chen et al. | | 709/206 |
| 2006/0242558 A1* | 10/2006 | Racovolis et al. | | 715/511 |
| 2006/0259983 A1* | 11/2006 | Sperry | | 726/28 |
| 2006/0277260 A1* | 12/2006 | Hardy | | 709/206 |
| 2008/0163341 A1* | 7/2008 | Adams et al. | | 726/4 |
| 2008/0307492 A1* | 12/2008 | Nakamura et al. | | 726/1 |
| 2009/0025063 A1* | 1/2009 | Thomas | | 726/4 |
| 2009/0044248 A1* | 2/2009 | Nakamura et al. | | 726/1 |
| 2009/0164878 A1* | 6/2009 | Cottrille | | 715/210 |
| 2009/0282493 A1* | 11/2009 | Bhide et al. | | 726/28 |
| 2009/0282494 A1 | 11/2009 | Bhide et al. | | |

OTHER PUBLICATIONS

Bhide et al., U.S. Appl. No. 12/117,829, Office Action Communication, May 16, 2011, 9 pages.

Bhide, et al., U.S. Appl. No. 12/117,829, Office Action Communication Jul. 5, 2012, 12 pages.

Bhide, et al., U.S. Appl. No. 12/117,829, Office Action Communication, Dec. 20, 2012, 18 pages.

Bhide, et al., U.S. Appl. No. 12/117,829, Notice of Allowance Communication, Mar. 5, 2013, 18 pages.

* cited by examiner

METHOD AND SYSTEM FOR MANAGING ELECTRONIC MESSAGES

CROSS-REFERENCE TO RELATED APPLICATIONS

This application is related to the following co-pending applications filed concurrently herewith by the same Applicants and assigned to the same Assignee, namely, International Business Machines Corporation (IBM Corporation): "METHOD AND SYSTEM FOR MANAGING ELECTRONIC MESSAGES", U.S. patent application Ser. No. 12/117,829, filed May 9, 2008. The complete disclosure of this co-pending application is incorporated herein by reference.

BACKGROUND OF THE INVENTION

1. Field of the Invention

The present invention relates generally to a data processing system and in particular to a method and apparatus for communications systems. More particularly, the present invention is directed to a computer implemented method and computer usable program code for efficiently managing access control in an electronic messaging system.

2. Description of the Related Art

Electronic messaging (herein after referred to as email(s)) systems have become a standard means of communication in the business world, as well as with the general population. Typically, messages sent to one or more recipients are exchanged numerous times through reply and forwarded messages, creating a message thread or chain, which may be referred to as an email chain. Each time a message is exchanged between various recipients, the email chain becomes larger as each previous message is included in subsequent messages.

Emails generally do not have support for access control. Typically access control is required when a mail is sent to multiple recipients. Many-a-times different parts of the single email will have to be made visible to different recipients depending on the access rights of the recipients. The access rights depend on various factors such as the position of the recipient in the hierarchy of the organization, the role of the recipient (role based access control) etc. This is typically true of the emails sent by senior people within an organization who have to send mails to various set of people with different access control. For example, in a particular scenario, a common disadvantage is that the secretaries of these senior people are privy to a lot of information for which ideally they should not have access.

Consider the mail trail illustrated below, wherein the sender and recipients of the mail trail are highlighted.

Mark,
  I have received the following mail from the Tim Smith who is the research relationship manager for Government sector. NASA has expressed interest in the unstructured information management work done at ABC Bank. They want to use our work for detecting financial fraud in the banking sector. Can we meet today in the afternoon to discuss this?
Suzanne, Please set up a one hour meeting with Mark today afternoon.
Thanks,
John.
<Begin Mailfrom Tim>
. . .
. . .
<Begin Mailfrom NASA>
. . .
. . .
<End Mailfrom NASA>
. . .
<END Mail from Tim>

In the example cited above, the sender of the email John who is the director of the organization. The mail is addressed to Mark who is a senior manager and Suzanne one of the other recipients is the secretary of John. In the above email, since the contents of the email are confidential, the secretary should not have access to that part of the email which is addressed to John.

Without a method and system to improve communication of email with specific access controls being introduced to the recipients by a sender the promise of this may never be fully achieved.

SUMMARY OF THE INVENTION

The illustrative embodiments provide a method, system for efficiently managing access control in an electronic messaging systems. Various segments in an email are earmarked and identified and depending on the role of the recipient for example, the role of the recipient within an organization, access rights and privileges are identified and setting access control privileges to the contents of the email and providing access to view and edit contents of the email to the recipients only to those parts of the contents that the particular recipients has been allocated access. Other embodiments are also disclosed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
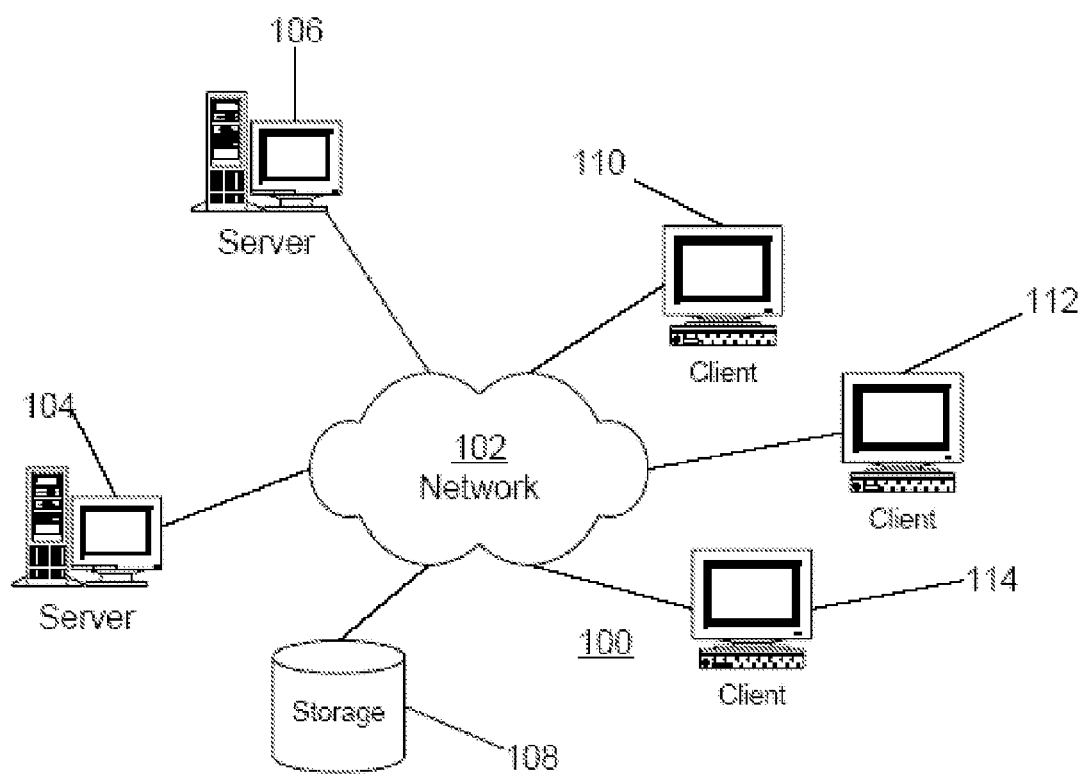
FIG. 1 is a pictorial representation of a network of data processing systems in which illustrative embodiments may be implemented.
Figure 2:
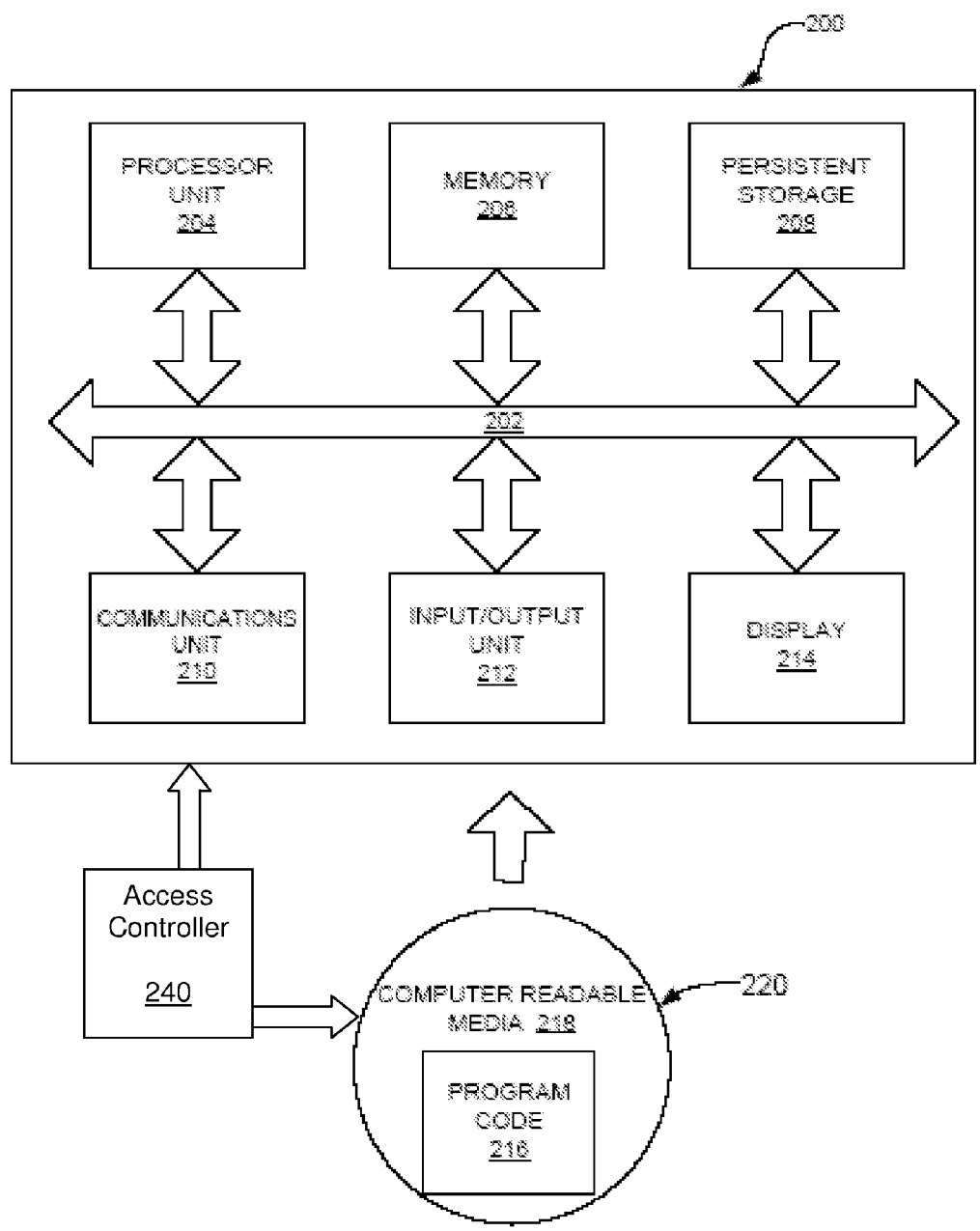
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, fiber optic cables or a combination thereof.

In the depicted example, server 104 and server 106 connect to network 102 along with storage unit 108. In this example, server 104 includes an electronic messaging system manager for managing access controls in electronic messages, and in particular in electronic message chains. Electronic messages may be exchanged between computer devices, such as clients 110, 112, and 114.

In addition, clients 110, 112, and 114 connect to network 102. Clients 110, 112, and 114 may be, for example, personal computers, network computers, laptop computers, PDA's, mobile phones and the likes. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). In one embodiment, the network 102 may also includes mobile switching networks connecting mobile devices and routing traffic via a base station. FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multiprocessor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links. Various other devices such as a modem, IEEE 1394 interface etc. may be used as a communication units and it should be apparent to a person skilled in the art that such devices being used as communication unit 210 fall under the scope of the present invention.

Input/output unit 212 allows for input and output of data with other devices that may be connected to data processing system 200. For example, input/output unit 212 may provide a connection for user input through a keyboard and mouse or microphone. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize a need for an electronic messaging system that is capable of automatically managing electronic message history in an electronic message chain, so as to decrease the size and increase the transmission speed of subsequent electronic messages in an electronic message chain.

Therefore, the illustrative embodiments provide a method, apparatus and computer program product for efficiently managing access control in electronic messaging systems, and more specifically to the contents within the electronic message. Various segments in an email are earmarked and identified and depending on the role of the recipient for example, the role of the recipient within an organization, access rights and privileges are identified and setting access control privileges to the contents of the email and providing access to view and edit contents of the email to the recipients only to those parts of the contents that the particular recipients has been allocated access. In one embodiment, the sender may provide the access rights based on the privileges that the sender requires to set for the recipients. In a further embodiment, the access privileges may be programmed in the electronic messaging system and the system may be configured to automatically retrieve these privileges and implement them to the contents of the mail. In yet a further embodiment, a combination of automation which can be user defined may also be implemented.

Figure 3:
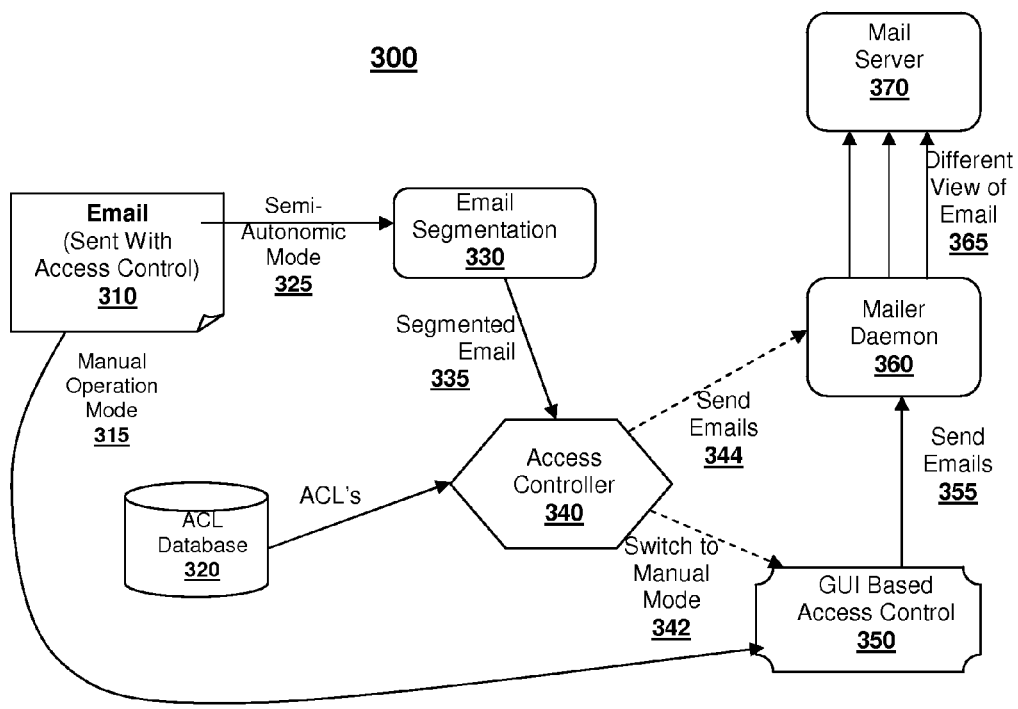
FIG. 3 is a block diagram illustrating architecture of an electronic messaging system.

FIG. 3 is a block diagram illustrating a general architecture of an electronic messaging system manager that is configured to provide access control to the contents of an electronic mail. The architecture 300 may be implemented using any type of computing device, including, without limitation, a personal computer, laptop, personal digital assistant, mobile phones, a server, or any other computing device depicted in FIGS. 1 and 2.

Mail server 370 is software maintained in a network environment for managing access control to contents within an electronic messaging in a electronic messaging systems. Mail server 370 may be implemented as any type of server, such as, without limitation, server 104 in FIG. 1. Other components described below as independent components or forming part of client (client 110 in FIG. 1) can in a preferred embodiment be implemented on mail server 370. One or more of these functions indicated in FIG. 3 may be implemented independently in server 370 or as individual components or on client or a system composed of a client-server with various devices coupled to the system.

Typically an email 310 is first composed by the user (sender of the email), which may be transmitted to a number of recipients with access control provided in email, which will be added to email 310 in the following description. In semi-autonomic mode 325 of operation, email segmentation 330 module is configured to first segmented email 310 into various categories. In one embodiment segmentation of email 310 can be performed based on certain pre-defined criteria or such criteria may be user defined for each email 310.

Segmented email 335 is then handed over to access controller 340. Access controller 340, uses the access control information present in ACL (Access Control List) database 320. The ACL database 320 could be in the form of the hierarchy of the users in the organization which can be stored for example in the form of an LDAP directory. For example, in one embodiment using such information that is provided in ACL database 320, access controller 340 is configured to segregate the recipients for each segment. Access controller 340 can use different types of algorithms such as level based access control etc., and is described below. It should be obvious to one skilled in the art that access controller 340 may interact with other databases to which it may be coupled to determine the access control list.

Recipients and the segments are then shown to the user, preferably in GUI based access control 350. If the user is satisfied with the result then the email is sent 335 to mailer daemon 360. If the user is not satisfied with the segmentation and the access control enforced by the access controller, then user is provided with an option to switch over to manual mode 342. In manual mode 342, the recipients for each segment are assigned manually by the user using GUI based access control 350. Further, GUI access based control 350 provides user with an option to perform segmentation on the contents of the email as desired by the user.

Once segments and recipients for each segment have been marked by the user; email is forwarded or sent 344 to the mailer daemon 360. Mailer daemon 360 routes to email categorized into different view groups 365 to a mail server 370, wherein the user may be provided with an option to download the contents of the mail to a client system or to be directly viewed on mail server 370.

Figure 4:
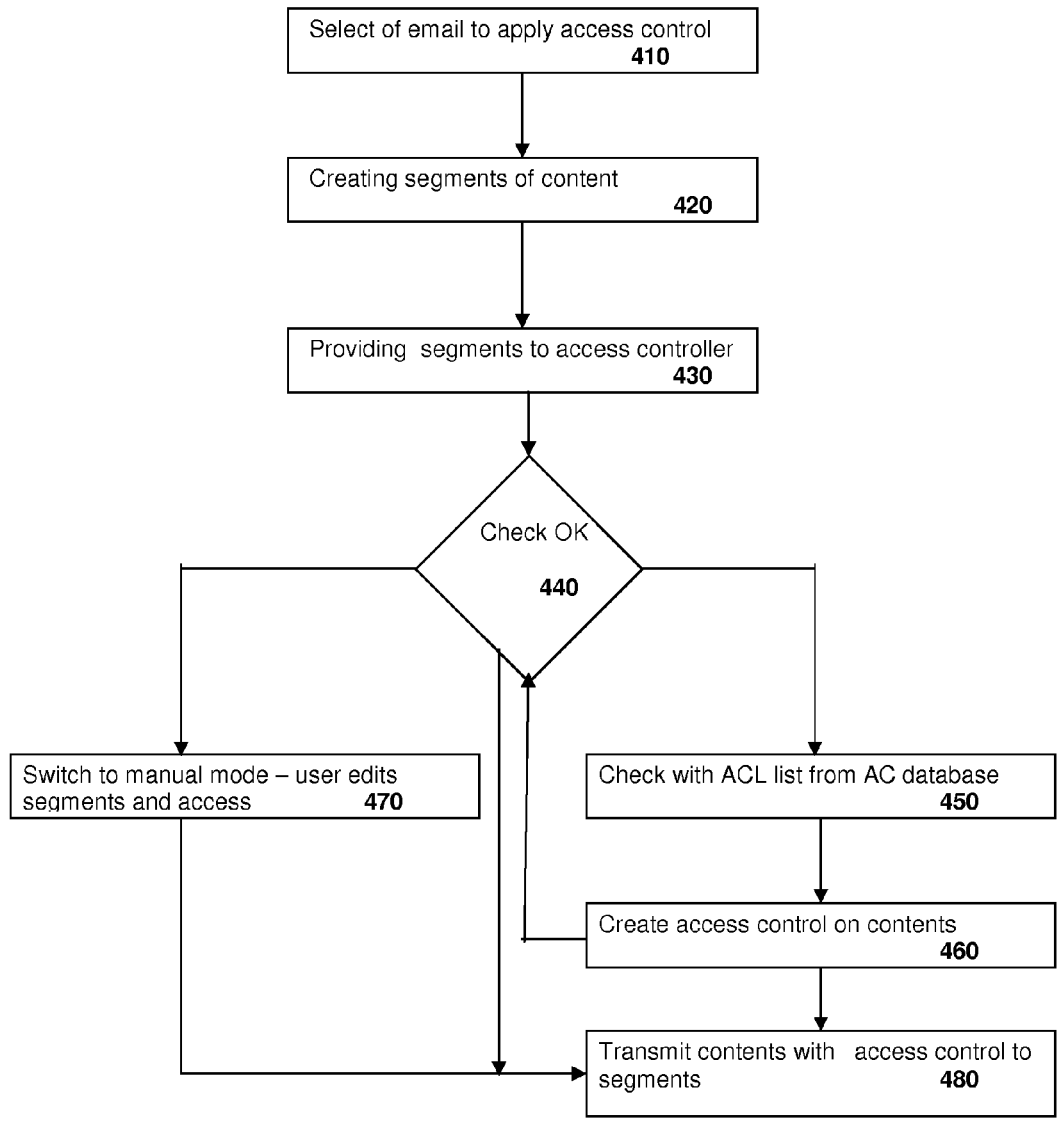
FIG. 4 is a flowchart illustrating method for creating access control to contents of an electronic message.

FIG. 4 is a flowchart illustrating method 400 for creating access control to contents of an electronic message. Method/process for creating/setting access control on the contents in an electronic message begins with selection of an electronic message (Step 410). Once the electronic message is identified, the contents of the electronic messages are segmented, preferably into different categories defined by a set of pre-determined rules or as selected by a user (Step 420). After the contents have been segmented into the various categories required, segments are routed to an access controller (Step 430), as described previously in FIG. 3, which in turn is coupled to a access control database, the access control database being provided with a access control list which can be advantageously implemented on the contents of the electronic message.

At this stage a consistency check is performed on the contents (Step 440), where a check is made to determine if the contents of the electronic message has been provided with access as per the access control list. During the consistency check it can be determined that access control has been provided or not provided to the contents of the electronic message.

In one embodiment, a user is allowed to edit the access control and/or the segments of the electronic message to provide access controls as determined by the user, and further choice of segmentations made by the user (Step 470). After the user has edited the segments of the electronic message and provided access control to the contents of the electronic message (using a GUI based access control tool, as described previously in FIG. 3), the contents of the electronic message with access control can be transmitted to recipient, where the recipient is configured to receive the mail on a mail server or a mail client (Step 480)

In another embodiment, after consistency check (Step 440), if it is determined that the electronic message has already been provided with access control to every segment of the content embedded within the electronic message (as might be required by the user), the method can either proceed to transmit the electronic message (Step 480) or may be configured to switch to a manual mode, wherein the user may edit the segments and/or the access control (Step 470).

In another embodiment, after check (Step 440), it is determined that the contents of the electronic message has not been segmented and/or provided with access control, the contents of the email is segmented (Step 420) and the segmented contents is provided to the access controller (Step 430). After this, the access controller, which interfaces with the access control database, check with the access control list provided in the database (Step 450), and subsequently creates access control on the contents as specified in the access control list (Step 460). Once access control is provided to the contents of the electronic message as provided in the access control list, the contents of the electronic message is transmitted to a recipient, which will be received by the recipient mail server or client (Step 480).

Figure 5:
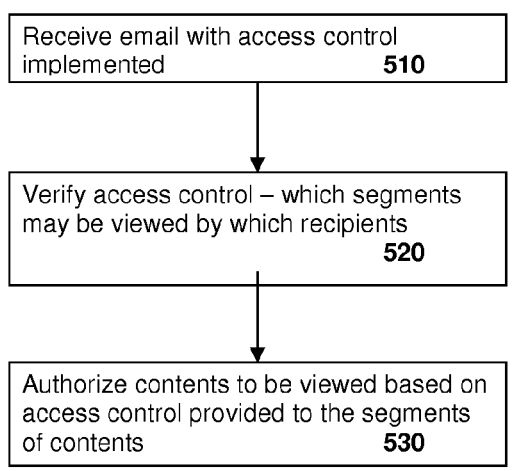
FIG. 5 is a flowchart illustrating a process for allowing and restricting access to contents in an electronic message.

FIG. 5 is a flowchart 500 illustrating a process for allowing and restricting access to contents in an electronic message for a recipient of a message. The recipient receives an electronic message in which the sender of the email has implemented access control (Step 510). The access controller performs a consistency check that the electronic message has been segmented and access control has been provided to various users to the various segments of the electronic message (Step 420). When the recipient accesses the electronic message, only segments of contents that have been authorized by the sender of the electronic message for the particular recipients, may be viewed by those recipients (Step 530).

In another embodiment, when a mail with access control is sent by the mail server of the sender, different copies of the mail may be sent out—one for each user with a different access right, depending on the access rights that are selected. This means that if a mail with access control is to be sent to two persons, with different segments visible to the two people, then two different copies of the mail may be created. The first copy consists of those segments that are visible to the first user (i.e., those segments on which the user has access rights) and the second copy consists of those segments that are visible to the second user. These two different copies are sent out as two different emails by the mail client of the sender. It should be obvious therefore that if there are multiple recipients, then each of the recipients may receive only those segments to which they have been provided access rights.

To further explain the invention, for example, consider the following mail tail:
Mark,
I have received the following mailfrom the Tim Smith who is the relationship manager for Government sector. NASA has expressed interest in the unstructured information management work done at ABC Bank. They want to use our work for detecting financial fraud in the banking sector. Can we meet today in the afternoon to discuss this?
Suzanne, Please set up a one hour meeting with Mark today afternoon.
Thanks, John.

<Begin Mailfrom Tim>
. . .
. . .
<Begin Mailfrom NASA>
. . .
<End Mailfrom NASA>
. . .
<END Mail from Tim>

In the above example the sender of the email is John who is the Director of the organization. The mail is addressed to Mark who is a senior manager and Suzanne is the secretary of John. In the email, the secretary, Suzanne, should not be provided with any access to that part of the email which is addressed to John and Mark. According to the embodiments of the invention as described previously, the different segments of the email are automatically identified or may be identified by the user. The method 400 identifies users Suzanne, Mark and John as part of the organization and depending on the role they play within the organization their access rights are identified and Suzanne is not shown the portion of the email that is addressed to Mark.

Consider another example
Hi Chi,
Thanks a lot for your help. As discussed in today's meeting, I would like to follow this up with the director of HR, XYZ Corp. Can you please schedule a one on one meeting with the director of HR, XYZ Corp. I would also like to discuss the growth prospects for managers with him as this is of grave concern to people like me.
Ray: Please coordinate with Chi and set up a meeting with Robert (VP HR, XYZ Corp) on Monday the $21^{st}$ of June.
With best regards,
Mark.

In the above example, the mail is sent by Mark who is a senior Manager in the organization. Chi is the HR manager and Ray is the secretary of Mark. In this example, the proposed method is a technique by which Ray will not be able to see the portion of the email addressed to Chi. This is again done automatically and/or by manual intervention and based on the access rights of Ray and Chi which is automatically determined based on the hierarchy of users in the organization.

In the above mentioned examples of emails it is evident that not all portions of the emails should be visible to all the recipients of the email. This disclosure overcomes a long standing needs of a mechanism that accomplishes implementing access control to segments of email contents, which may be done automatically and/or manually. The mechanism will have two execution modes: Semi-Automatic Mode and the Manual Mode In the Semi-Autonomic Operation Mode of operation, the following steps are performed Operation Invocation: In this mode of operation, the system will provide a separate button called "Send with Access Control" or "Reply with Access Control" in addition to the standard buttons. This functionality will invoke the Email Access control system.

Email Segmentation: The system will parse the email and will look for specific tags like a person name at the beginning of the line. These tags will allow the email to be segregated into different segments. A segment of the email is that portion which is addressed to a one or more people using specific tags at the beginning of the segment. Tags could include the person name or generic names such as "Senior Managers" or "Managers" etc. These tags could be user defined and stored on a per-user basis or could be common across all users and stored at the email server. The segment ends at that point where the mail ends of a separate segment begins.

Access Control: The system will have access to the access control system at the back end. The access control system can be something similar to hierarchy information about an organization or the access control list present in email system. For example, Lotus Notes (which is an email system from IBM®) allows the administrator to provide access to first line managers, second line managers and various other combinations. Hence using such type of access control infrastructure, it will determine the hierarchy of users in the organization. Using this it will apply the following rules:

1. The segment addressee will obviously have access to his/her segment. In addition to that a mail recipient will also have access to the segment of the person reporting to him/her (directly or indirectly).

2. Another option to provide access control would be to have level based access control. In this the access control list will have multiple levels. E.g., The director of an organization would be at level 4, Senior Managers at Level 3, First line Managers at Level 2 and all others at Level 1. A person at level X will only see the segments whose segment addressee is at a level lower than X. This will ensure that in case of a mail sent to senior managers and Suzanne, Senior managers will be able to see the entire contents of the email but Suzanne will only see the segment addressed to her.

Access Confirmation: When the "Send with Access Control" button is clicked, the access control rules will be applied and the result will be shown to the sender. The result can be GUI based and will allow the sender to see how the mail will appear to each set of recipients. When the sender okays the mail, the mail will be finally sent out. If the sender is not satisfied with the access control rules or the segmentation done, then the sender can manually select different parts of the email and assign recipients to each segment manually. The manual assignment generated by the user, is used by the system to improve its segmentation. If a new segment is generated by the user repeatedly, then the system can learn the presence of new tags which can help it to generate better segments in the future. E.g., if a person uses the tag such as "Kids" and creates a segment starting at "Kids", then the system can learn that the "kids" signifies the starting of a new segment. If an access control change is being made by the user a significant number of times, then the system could learn some rules of the form "If a mail is sent to users A, B, C and the mail is also sent to "Y" then Y has the same access rights at A, B and C". Thus classical data mining can be used by the system to improve it performance.

Removing superfluous email ids in Reply: When the mail is sent out to a person X, the person can see the list of people to whom the mail was sent in the TO list. This list could include the set of people who could be peers of X. Such people may not have received the same copy of the email if the original mail has a segment addressed exclusively to X. Hence when X replies to the email, the mail should not be sent to the peers of X. Hence when the "Reply To" option of such a mail will not have the email of X's peers. The above mentioned steps in paras [0044]-[0050] provide one mode of implementations. It should be obvious to a person skilled in the art that various other implementation mode may be possible and these fall within the scope of the present invention.

In a further embodiment as discussed earlier, a Manual Operation Mode is provided. In the manual operation mode, the following steps will be taken:

Operation Invocation: In this mode of operation, the system will provide the same buttons ("Send with Access Control" or "Reply with Access Control") in addition to the standard buttons. This button will invoke the Email Access control system.

Email Segmentation: The system will parse the email and segregated the emails into different segments.

Manual Access Control: The system will then provide a GUI to the user using which the user can hide different segments of the email from specific users. The GUI will also allow the user to change the segments generated by the system. Once the assignment is done by the user, the email is finally sent out after making out the different segment of the emails for different users.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method comprising:
storing, in an access control database, an access control list providing for access control based on a hierarchy of users within an organization;
receiving, by a computing device, an electronic mail (email) message addressed from a sender to a recipient within said organization,
said electronic mail (email) message comprising message segments directed to different persons,
said different persons being associated in said electronic mail (email) message with tags,
each of said tags only indicating one of a position and a level of a person within said organization, and
said electronic mail (email) message further indicating that said sender has invoked access control on contents of said electronic mail (email) message;
when said sender has invoked said access control on said contents of said electronic mail (email) message, automatically parsing, by said computing device, said contents of said electronic mail (email) message to delineate said message segments directed to said different persons by identifying any of said tags at a beginning of each of said message segments;
automatically using, by said computing device, said access control list stored in said access control database to verify, based on said tags, access rights of said recipient with respect to each of said message segments; and
transmitting, by said computing device, said electronic mail (email) message to said recipient such that, when said recipient accesses said electronic mail (email) message, said recipient is able to view all said message segments for which said recipient has said access rights and none of said message segments for which said recipient does not have said access rights.

2. The computer-implemented method of claim 1,
said access control list indicating whether said recipient has any access rights to any message segment directed to said person given said one of said position and said level of said person within said organization.

3. The computer-implemented method of claim 1, said tags being obtained from a pre-defined list.

4. The computer-implemented method of claim 3, said pre-defined list being stored in a repository.

5. The computer-implemented method of claim 4, said pre-defined list being dynamically updated.

6. The computer-implemented method of claim 1, said using of said access control list to verify whether said recipient has said access rights comprising: applying, by said computing device, a set of access control rules to each of said message segments of said contents to ensure that only authorized recipients have access to said message segments.

7. The computer-implemented method of claim 6, said set of access control rules being stored in a repository.

8. The computer-implemented method of claim 6, said set of access control rules being defined by said sender of said electronic mail (email) message.

9. The computer-implemented method of claim 6, said recipient comprising multiple recipients having different access rights to said message segments such that said electronic mail (email) message is transmitted to said multiple recipients with different message segments visible.

10. A computer-implemented method comprising:
storing, in an access control database, an access control list providing for access control based on a hierarchy of users within an organization;
receiving, by a computing device, an electronic mail (email) message addressed from a sender to multiple recipients within said organization,
said electronic mail (email) message comprising message segments directed to different persons,
said different persons being associated in said electronic mail (email) message with tags,
each of said tags only indicating one of a position and a level of a person within said organization, and
said electronic mail (email) message further indicating that said sender has invoked access control on contents of said electronic mail (email) message;
when said sender has invoked said access control on said contents of said electronic mail (email) message, automatically parsing, by said computing device, said contents of said electronic mail (email) message to delineate said message segments directed to said different persons by identifying any of said tags at a beginning of each of said message segments;
automatically using, by said computing device, said access control list stored in said access control database to verify, based on said tags, access rights of each of said multiple recipients with respect to each of said message segments;
displaying, by said computing device to said sender, said access rights of each of said multiple recipients with respect to each of said message segments so as to allow said sender to modify said access rights; and
transmitting, by said computing device, said electronic mail (email) message to said multiple recipients such that, when said multiple recipients access said electronic mail (email) message, each recipient is able to view all of said message segments for which said recipient has said access rights as modified by said sender and none of said message segments for which said recipient does not have said access rights.

11. The computer-implemented method of claim 10,
for each recipient, said access control list indicating whether said recipient has any access rights to any message segments directed to said person given said one of said position and said level.

12. The computer-implemented method of claim 11, said tags being obtained from a pre-defined list and said pre-defined list being stored in a repository.

13. The computer-implemented method of claim 10, said multiple recipients having different access rights to said message segments such that said electronic mail (email) message is transmitted to said multiple recipients with different message segments visible.

14. The computer-implemented method of claim 10, said electronic mail (email) message from said sender to said multiple recipients comprising a body that, to date, has not been transmitted to any recipients and said message segments directed to said different persons comprising portions of said body.

15. The computer-implemented method of claim 10, said electronic mail (email) message from said sender to said multiple recipients comprising a body; and an electronic mail (email) chain following said body and comprising said message segments directed to said different persons.

16. A computer-implemented method comprising:
- storing, in an access control database, an access control list providing for access control based on a hierarchy of users within an organization;
- receiving, by a computing device, an electronic mail (email) message addressed from a sender to multiple recipients within said organization,
  - said electronic mail (email) message comprising a body and an electronic mail (email) chain following said body and comprising message segments directed to different persons,
  - said different persons being associated in said electronic mail (email) message with tags,
  - each of said tags only indicating one of a position and a level of a person within said organization, and
  - said electronic mail (email) message further indicating that said sender has invoked access control on contents of said electronic mail (email) message;
- when said sender has invoked said access control on said contents of said electronic mail (email) message, automatically parsing, by said computing device, said contents of said electronic mail (email) message to delineate said message segments directed to said different persons by identifying any of said tags at a beginning of each of said message segments;
- automatically using, by said computing device, said access control list stored in said access control database to verify, based on said tags, access rights of each of said multiple recipients with respect to each of said message segments, said multiple recipients having different access rights with respect to at least some of said message segments; and
- transmitting, by said computing device, said electronic mail (email) message to said multiple recipients such that, when said multiple recipients access said electronic mail (email) message, each recipient is said able to view all said message segments for which said recipient has said access rights and none of said message segments for which said recipient does not have said access rights and at least some of said multiple recipients are able to view different message segments due to said different access rights.

17. The computer-implemented method of claim 16,
for each recipient, said access control list indicating whether said recipient has any access rights to any message segment directed to said person given said one of said position and said level of said person within said organization.

* * * * *